April 29, 1952     G. V. DUE     2,594,885
IRRIGATION SIGNAL
Filed March 21, 1949     2 SHEETS—SHEET 1
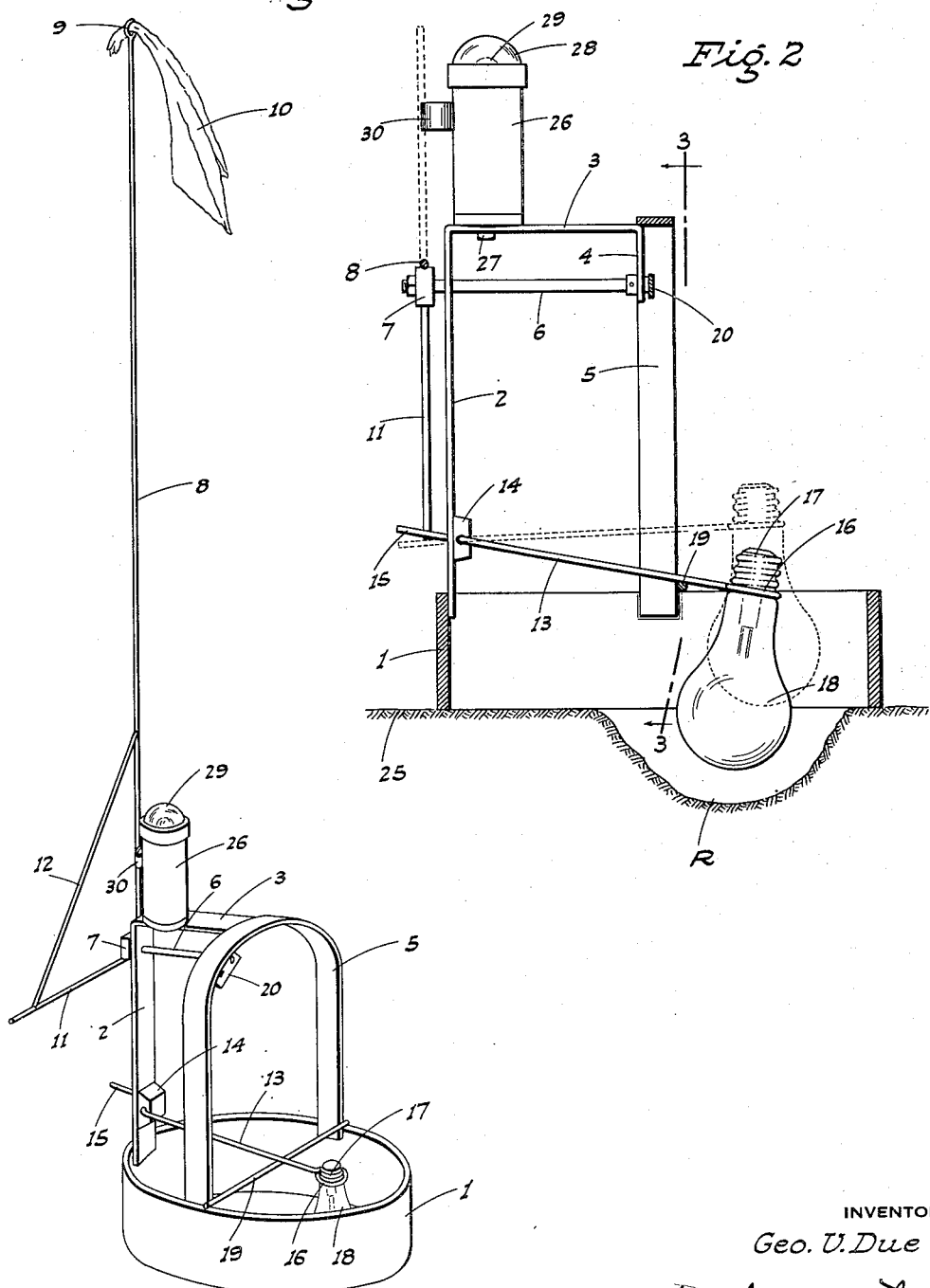
INVENTOR
Geo. V. Due
BY
ATTORNEYS April 29, 1952     G. V. DUE     2,594,885
IRRIGATION SIGNAL Filed March 21, 1949     2 SHEETS—SHEET 2

INVENTOR
Geo. V. Due
BY
ATTORNEYS

Patented Apr. 29, 1952

2,594,885

UNITED STATES PATENT OFFICE 2,594,885

IRRIGATION SIGNAL

George V. Due, Escalon, Calif.

Application March 21, 1949, Serial No. 82,640

4 Claims. (Cl. 116—118)

This invention is directed to, and it is an object to provide, a novel, float controlled irrigation signal; the signal, when placed on the ground, being operative upon flow of irrigation water to a certain point, and the device being designed to give a visible signal—by day or night—to the operator even though a considerable distance away.

Another object of the invention is to provide an irrigation signal which includes a novel float controlled, trigger released signal member operative—under the influence of a loaded spring—to swing from an initially set, lowered position to a released, upstanding signal position.

A further object of the invention is to provide an irrigation signal, as above, which embodies a readily replaceable float; such float being a conventional electric light globe secured to a float lever in novel manner.

An additional object of the invention is to provide an irrigation signal which includes an electric signal light unit which is automatically placed in operation whenever the aforesaid signal member is released to its upstanding signal position.

It is also an object of the invention to provide an irrigation signal which is designed for ease and economy of manufacture; the structure of the device being arranged to prevent accidental tipping over in wind, or by the water.

A further object of the invention is to provide a practical and reliable irrigation signal, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the device as in use, and released to signal position.

Fig. 2 is a sectional elevation of the device.

Figure 3:
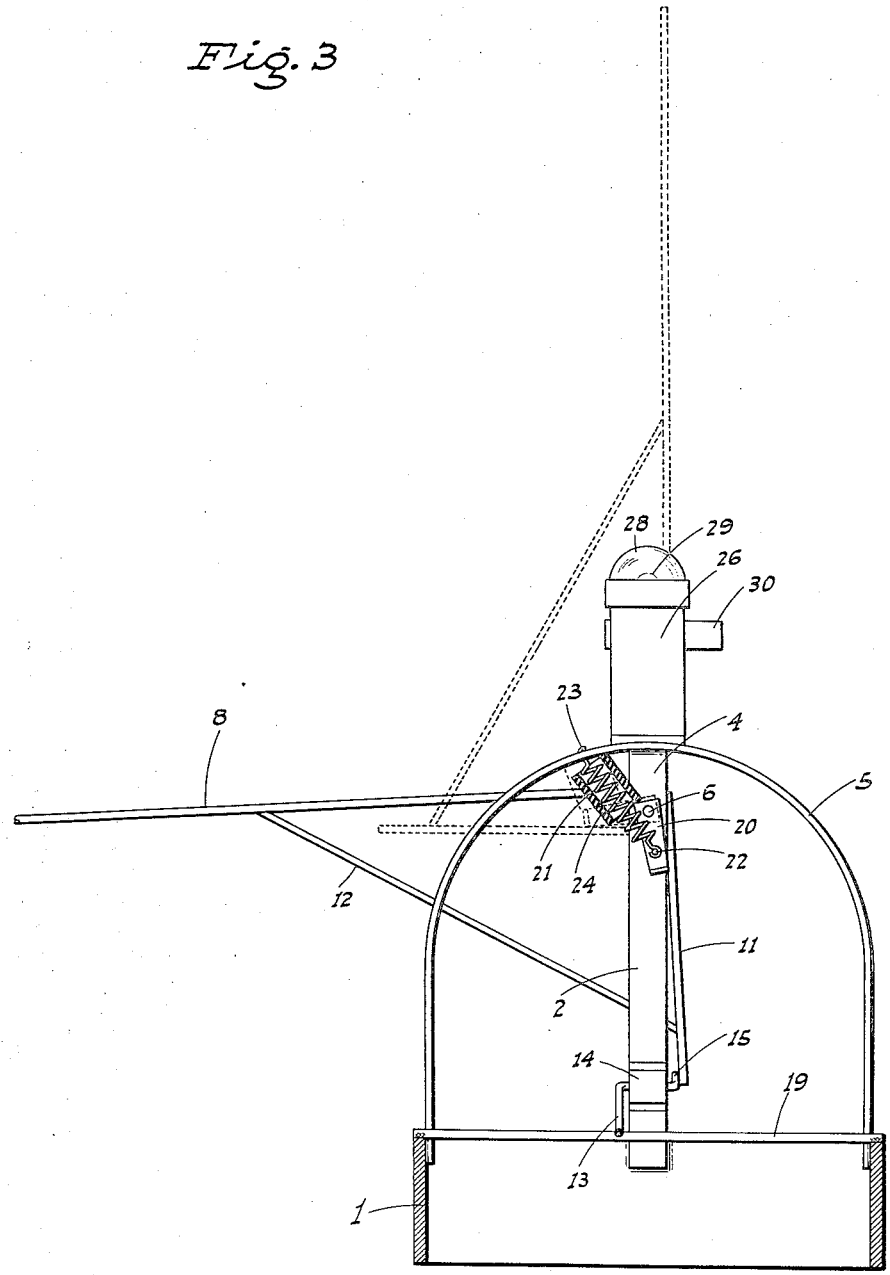
Fig. 3 is a cross section on line 3—3 of Fig. 2.

Referring now more particularly to the characters of reference on the drawings, the device comprises an upstanding relatively heavy base ring 1 having a relatively short post 2 fixed on, and upstanding therefrom, at one point.

The post 2 is formed, at the top, with an inturned top bar 3 which extends to a point substantially centrally above the ring 1; the top bar, at its inner end, including a dependent leg 4 parallel to the post 2. At said inner end the top bar 3 is affixed, as by welding, to the top of an upstanding bail 5, of generally inverted U-shaped configuration, secured to the base ring 1 at points approximately ninety degrees from the post 2.

A horizontal shaft 6 extends between the post 2 and leg 4, being mounted in connection with the same in rotatable relation. At its outer end the horizontal shaft 6 is fitted, outwardly of the post 2, with an attachment block 7 which is affixed to the lower end of a signal rod 8; the latter being elongated, and in signal position upstanding in the manner shown in Fig. 1.

At its upper end the signal rod 8 includes an eye 9 for the reception of a signal flag 10.

At its lower end the signal rod 8 includes a right angle leg 11, maintained in rigid relation by a diagonal brace 12.

A float lever 13, in the form of a rod, extends generally diametrally across the base ring 1 mainly thereabove and toward the post 2; such float lever 13 having a right-angle lateral offset therein which is carried in a bearing block 14 on the post 2 some distance below the attachment block 7. A short end portion of the float lever 13 extends from the bearing block 14 outwardly of the post 2 as a trigger 15.

The forward end of the float lever 13 is formed with an eye 16, into which the neck 17 of a conventional electric light globe 18 is threaded, whereby said globe depends from such eye 16. In this manner an electric light globe is provided as the float of the device, being in instrumentality which can be replaced easily and inexpensively.

Swinging of the float lever 13 and the globe 18 below a predetermined point is prevented by a cross rod 19 on the top of the ring 1, and against which cross rod the float lever normally rests.

At its inner end the horizontal shaft 6 is fitted with a short radial lever 20 which is normally dependent, and a tension spring 21 is connected to said lever adjacent its free end, as at 22; such spring thence extending diagonally to connection with the bail 5, as at 23. The relation of the lever 20 and spring 21 is such that the spring tends to act to rotate the shaft 6 in a direction to erect the signal rod 8.

A relatively short cushion sleeve 24 surrounds the spring 21 for the purpose hereinafter described.

To set the irrigation signal, the signal rod 8 is swung from its upstanding position, as in Fig. 1, downward to a substantially horizontal position, as in full lines in Fig. 3. This swings the leg 11 to a dependent position in which it is engaged, adjacent but short of its lower end, by the trigger 15 on the side which prevents erection of the signal rod 8 by spring 21.

With the irrigation signal thus set it is placed on the ground surface 25 with the float 18 projecting downwardly into a recess R which is dug in the ground within the base ring 1.

When the flow of irrigation water reaches the device, and recess R fills with water, the float 18 rises from its full line to its dotted line position, as in Fig. 2, causing the float lever 13 to move upwardly and the trigger 15 to move downwardly. Such downward movement of the trigger 15 causes its escape from the leg 11, whereupon the spring 21 acts to swing the signal rod 8 to its erect position, as previously described. When this occurs the radial lever 20 swings toward the cushion sleeve 24 and engages the adjacent end thereof in shock absorbing relation. Additionally, such cushion sleeve 24 prevents the spring 21 from carrying the signal rod 8 beyond an erect position.

When the device is released by the irrigation water, as above, with resultant erection of the signal rod 8, the signal flag 10 is readily visible by day by the operator, even though he may be a substantial distance from the device.

If it is desired to delay action of the signal until the water increases in depth to a certain level, the float lever may be bent so that the trigger releases only when the float rises to said level.

The following signal means is provided for night use of the device.

A signal light unit, indicated generally at 26, is mounted on, and upstands from, the top bar 3 adjacent its outer end; such signal light unit 26 being generally of flash-light type and being secured, in electrically grounded relation, to the top bar 3 by a bolt 27. The signal light unit 26 includes a transparent dome 28 at the top, and the globe 29 is disposed in said dome.

The signal light unit 26 is normally deenergized, but upon release of the signal rod 8 and its movement to an erect position, such rod engages a contact wiper 30 on the adjacent side of the unit 26, which completes the circuit for the latter, whereupon the globe 29 is energized. Thus, at night, even though the operator cannot see the signal flag 10, the signal light unit 26 is illuminated, indicating to the operator that the signal has been released by the irrigation water reaching a predetermined point.

The irrigation signal described above provides a very effective and practical device, for the signaling, even at long range, with respect to irrigation water control.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure of the invention, as defined by the appended claims.

Having thus described the invention, the following is claimed as new and useful, and upon which Letters Patent are desired:

1. An irrigation signal comprising a ground-supported base, an upstanding frame on the base and including a post, a horizontal shaft journaled in the post adjacent the upper end thereof, an elongated signal rod extending radially from the shaft, an extension leg rigid with the rod at substantially 90 degrees thereto and radially of the shaft, a spring acting on the rod tending to swing the same to an upstanding position, a substantially horizontal lever below and extending lengthwise of the shaft, said lever having a short leg and a long leg and being pivoted on the post on a horizontal axis at a right angle to the shaft, the short leg being adapted to engage and releasably latch said extension leg when the signal rod is swung down to a substantially horizontal position and the spring is placed under load, and a float on the outer end of the long leg of the lever.

2. A signal as in claim 1, in which the base is in the form of an upstanding endless band; the float being disposed within the confines of the band.

3. A signal as in claim 2, in which the float is an electric light bulb having a threaded base, the lever at said outer end having a vertical-axis eye into which the bulb base removably screws.

4. An irrigation signal comprising a ground-supported base, an upstanding frame on the base and including a post, a signal rod pivoted at its lower end on the post, a lever pivoted on the post below the rod pivot, latch means between the rod and the lever at one end thereof to releasably hold the rod in a substantially horizontal position, means acting on the rod and tending to swing the same to an upstanding position, and a float on the other end of the lever, the latch means being released upon predetermined upward movement of the float; the base being in the form of an upstanding endless band and the float being a depending electric light bulb disposed within the confines of and protected by said band.

GEORGE V. DUE.

REFERENCES CITED

The following references are of record in the file of this patent:

UNITED STATES PATENTS

| Number | Name | Date |
| --- | --- | --- |
| 884,964 | Voss | Apr. 14, 1908 |
| 1,248,633 | Doak | Dec. 4, 1917 |
| 2,082,763 | Garrison | June 1, 1937 |